United States Patent [19]
Wada

[11] 3,748,979
[45] July 31, 1973

[54] ELECTRONIC SHUTTER APPARATUS FOR CAMERAS

[75] Inventor: Yasuhiro Wada, Tokyo, Japan

[73] Assignee: Kabushiki Kaisha Koparu, Tokyo-to, Japan

[22] Filed: Dec. 14, 1971

[21] Appl. No.: 207,807

[30] Foreign Application Priority Data
Dec. 28, 1970 Japan.............................. 45/125412
Dec. 28, 1970 Japan.............................. 45/125413

[52] U.S. Cl.............................. 95/10 CT, 307/238
[51] Int. Cl............................. G03b 9/62, G03b 7/08
[58] Field of Search................... 95/10 CT; 307/238

[56] References Cited
UNITED STATES PATENTS
3,603,799 9/1971 Nobusawa....................... 95/10 CT
3,703,130 11/1972 Watanabe......................... 95/10 CT
3,657,979 4/1972 Nobusawa....................... 95/10 CT
3,646,371 2/1972 Flad................................... 307/238

Primary Examiner—Samuel S. Matthews
Assistant Examiner—Russell E. Adams, Jr.
Attorney—Cushman, Darby & Cushman

[57] ABSTRACT

An electronic shutter apparatus suitable for single lens reflex cameras, arranged so that the storing of information on the brightness of the object to be photographed which is performed prior to photographing and the read-out of this stored information which is conducted at the time of actual photographing are both effected by the use of a digital circuitry, whereby the stored information on the brightness of the object to be photographed can be reproduced always with accuracy and without failure.

11 Claims, 6 Drawing Figures

INVENTOR
YASUHIRO WADA
BY
Cushman, Darby & Cushman
ATTORNEYS

ELECTRONIC SHUTTER APPARATUS FOR CAMERAS

BACKGROUND OF THE INVENTION

1 Field of the invention

The present invention is concerned with an electronic shutter suitable for single lens reflex cameras, which is arranged to effect the determination of the exposure time by the storing and read-out performances by a digital circuitry.

2 Description of the prior art

In an electronic shutter apparatus suitable for single lens reflex cameras, i.e., in electronic shutter apparatuses relying on the TTL system (Through The Lens System), it is necessary to memorize, prior to the mirror-up action or at the time of actual photographing, such information on the object to be photographed as related to the amount of exposure required at the time of actual photographing. To this end, there have been proposed various kinds of memorizing systems for storing the information on the object to be photographed prior to the mirror-up action.

One such prior proposal concerns a system for effecting the storing, in a capacitor, of such information in terms of potential. This was a sort of analog-system memorizing method. Accordingly, the memory potential tended to undergo a change by virtue of the leakage current occurring in the capacitor, transistors, base plate and other parts which were incorporated in the shutter apparatus and were utilized to effect the storage of information, and this change in the memory potential constituted a cause for the occurrence of an error in the memory.

Another prior proposal concerned a system relying on the selection of resistors. According to this system, arrangement was provided so that the final storage of information on the object to be photographed was performed by selecting, from a number of pre-set resistors by a selecting circuit, a particular resistor which was to be connected in series with a time-limiting capacitor. This selection was effected by first processing, by a digital circuit, the light coming from the object to be photographed in its stage prior to the mirror-up action, and then by actuating the selecting circuit with the output of this digital circuit. In this system also, the time-limiting capacitor and a number of resistors were connected in parallel with each other via transistors at the time the system was constructed. Therefore, this prior system also had the disadvantages such as the occurrence of current leakage and complication of the circuitry used.

SUMMARY OF THE INVENTION

It is, therefore, a general object of the present invention to provide an electronic shutter apparatus for cameras, which eliminates the occurrence of errors in the read-out of the stored memory of information on the object to be photographed, by arranging so that the storing of information on the object in the stage prior to the mirror-up action and the read-out or reproduction of the stored information at the time of actual photographing are both performed digitally.

Another object of the present invention is to provide an electronic shutter apparatus for cameras, which is arranged so that, prior to the mirror-up action, there are generated single pulses each having a pulse width inversely proportional to the brightness of the object to be photographed which has passed through the objective lens system, and that throughout the period in which these single pulses are generated, one of the gate circuits is opened to pass therethrough the continuous standard CLOCK pulses, and that, by dividing the frequency of these CLOCK pulses by one of the binary counters, the number of the arriving pulses is memorized in terms of the numerical value indicating the intensity of brightness of the object to be photographed, and that, at the time of actual photographing, the other of the gate circuits is opened in accordance with the release of the shutter to pass therethrough the standard CLOCK pulsee and the frequency of the resulting standard CLOCK pulses is divided by the other one of the binary counters, and that at the time when the number of the standard CLOCK pulses appearing at the output-stage binary counter coincides with the aforesaid memorized numerical value, either the shutter blades (or rear curtain) is caused to effect the closing action.

Still another object of the present invention is to provide an electronic shutter apparatus which comprises a photoelectric single pulse generating circuit and a trigger pulse generating circuit and is arranged to be operative so that throughout the period, prior to the mirror-up action, in which single pulses are generated from the photoelectric single pulse generating circuit, those CLOCK pulses coming from the standard clock pulse generating circuit are passed through one of the gate circuits and the resulting CLOCK pulses are applied to the UP input of the UP-DOWN counter means to be counted thereby and the numerical value of this count is memorized, and that at the time of actual photographing, the trigger pulse generating circuit is actuated so that the resulting CLOCK pulses are passed through the other of the gate circuits in succession, and these CLOCK pulses are led to an appropriate dividing circuit where the output of this dividing circuit is applied to the DOWN input of the aforesaid UP-DOWN counter means, and that at the time when the numerical value of said UP-DOWN counter means becomes zero, either the shutter blades (or the rear curtain) is controlled.

Yet another object of the present invention is to provide an electronic shutter apparatus having an alarm lamp which is adapted to be lighted upon the arrival, at the UP-DOWN counter means, of CLOCK pulses in a number exceeding the predetermined number.

A further object of the present invention is to provide various modifications of circuit arrangement for digitally effecting the storing and read-out of information.

According to the electronic shutter apparatus of the present invention, it should be understood that if the photoelectric single pulse generating circuit generates such single pulses that correspond exactly to the brightness of the object to be photographed, the amount of the error in the exposure time will be less than the length of a single CLOCK pulse having a very small period. In other words, the stored information on the object to be photographed will never become lost during the period from the mirror-up action (or from the completion of storing) till the actual photographing, because a memory in terms of numerical value will never give rise to the problem of leakage current occurring in the constituting parts which has been the case with the conventional electronic shutter apparatuses.

DESCRIPTION OF THE PREFERRED EMBODIMENTS

Figure 1:
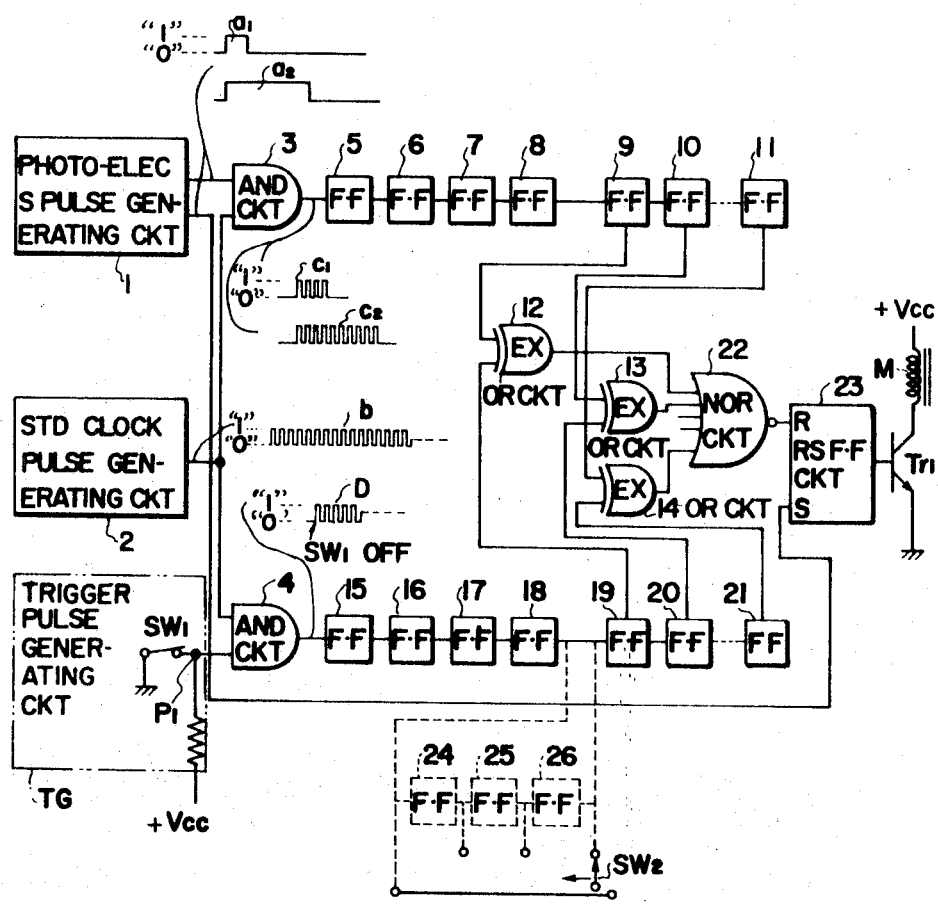
FIG. 1 is an explanatory block diagram showing an example of the electronic shutter apparatus according to the present invention, showing concurrently those waveforms appearing at the respective points.
Figure 2:
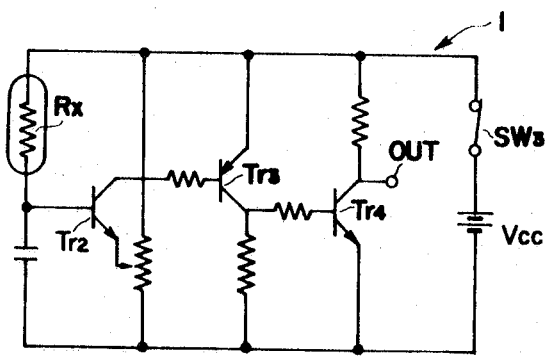
FIG. 2 is an electric circuit diagram showing an example of the photoelectric single pulse generating circuit employed in the present invention.

In FIG. 1, reference numeral 1 represents a photoelectric single pulse generating circuit for generating single pulses which are so controlled as to have a pulse width inversely proportioned to the brightness of the object to be photographed. An example of this photoelectric single pulse generating circuit 1 is shown in FIG. 2, which will be described later. This single pulse generating circuit 1 contains a photoelectric element which is arranged at a position at which it receives, at the time of TTL light measurement, the light coming from the object to be photographed after passing through the objective lens system, and is operative so that normally it generates single pulses at the stage prior to the mirror-up action or, in other words, at the time for the memorizing of the information on the object in its stage prior to the actual photographing, by utilizing the initial part of action of the shutter release button. Numeral 2 represents a standard clock pulse generating circuit for generating CLOCK pulses having a continuous constant frequency. This frequency of the pulses generated from the standard clock pulse generating circuit 2 is understood to be selected so as to be sufficiently large, even for the smallest pulse width of the pulses generated from the circuit 1, i.e., even for the pulse width of the pulses that are generated therefrom when the brightness of the object to be photographed is the highest. TG represents a trigger pulse generating circuit, which contains a trigger switch $SW_1$. When this trigger switch $SW_1$ is opened in interlocking relation with either the mirror-up mechanism or the shutter opening mechanism, the potential at point $P_1$ is rendered positive as this switch is connected to the positive power source voltage Vcc, and a theoretical output "1" is applied to the input of an AND circuit 4. It should be understood that, in this specification, "0" and "1" signify theoretical values, and that, with respect to voltage, positive theoretical values are adopted and further that, in case the voltage is either 9 or negative, the theoretical value will be mentioned as "0". Accordingly, in the state of the trigger switch $SW_1$ being closed, point $P_1$ will be connected to the ground so that the input of the AND circuit 4 will be "0". And, the signals coming from the aforesaid circuits 1 and 2 and from the trigger pulse generating circuit TG are fed, as the input information indicating the intensity of the brightness of the object to be photographed, to the AND circuits 3 and 4, respectively, as illustrated.

During that part of operation of the shutter apparatus at the time when the information of the object prior to the mirror-up action is stored, the trigger switch $SW_1$ remains in its closed state. Accordingly, the output of the trigger pulse generating circuit TG, i.e., one of the inputs of the AND circuit 4, is in "0" level. Accordingly, the output of the AND circuit 4 is in "0" level also. Thus, those circuits which are provided in the stages subsequent to this AND circuit 4 remain inoperative. In this state of the foregoing parts, let us assume that the initial part of the depressing action of the shutter release button is utilized to generate, from the single pulse generating circuit 1, a single pulse $a$ carrying the information on the light coming from the object to be photographed (this signal will be shown as $a_1$ in case the light from the object is bright, whereas it will be indicated as $a_2$ when the light is dark). Whereupon, one of the outputs of this circuit 1 is applied, as a setting input, to an RS flip-flop circuit 23. As a result, the output of this circuit 23 becomes "1" in level, rendering a transistor $Tr_1$ conductive to energize an electromagnet M so that the latter is rendered to the state in which it can hold the shutter blades. On the memory side, by the other of the outputs of the circuit 1, an input having a theoretical value "1" is applied to the AND circuit 3 only for the period of time equal to the pulse width of the single pulse signal $a$. Accordingly, the continuous CLOCK pulse $b$ generated from the standard clock pulse generating circuit 2 is gated, so that at each time that this CLOCK pulse $b$ becomes "1" in level, the output of the AND circuit 3 is rendered "1". Therefore, the output signal $c$ of the AND circuit 3 will be produced as an output signal $c_1$ in case the object is bright, whereas the output signal $c$ will be derived as an output signal $c_2$ in case the object is dark. Thus, it will be understood that the number of pulses will differ in accordance with the intensity of brightness of the object to be photographed. The pulse of this output signal $c$ is fed to the flip-flop circuits (hereinafter to be abbreviated as F—F circuits) 5, 6, 7, 8, 9, 10 and 11, in this order, so that the frequency of the output pulse c is divided progressively thereby. As a result, the number of the CLOCK pulses generated during the period of time equal to the pulse width of the single pulse signal $a$ will be eventually memorized in the F—F circuits, especially in those output stage F—F circuits 9 - 11, even after the extinction of the single pulse signal $a$. The respective outputs of the output stage F—F circuits 9 - 11 will produce an output which is either "1" or "0" in accordance with the memorized numerical value. These outputs will therefrom be fed to EXCLUSIVE (hereinafter to be abbreviated as EX) OR circuits 12, 13 and 14, respectively. Therefore, the F—F circuits 5 - 8 are intended for dividing the frequency of the output pulse in about four stages, i.e., to about 1/16, prior to being fed to the output stage F—F circuits 9 - 11 assigned for memory. Thus, the circuitry as a whole can be markedly simplified as compared with the arrangement designed so as to make a comparative detection on each of the F—F circuits in the entire stages 5 - 11. For the sake of convenience of explanation, there are shown here only three 9 - 11 of such output stage F—F circuits which are assigned for memory. In practice, however, it is desirable to provide these F—F circuits in about 15 stages to be able to cover a wide exposure time range of from 1/1000 of a second to 32 seconds which would be encountered ordinarily.

Now, at the time of completion of the aforesaid storage of information, the output from the photoelectric single pulse generating circuit 1 has been already rendered to the level of "0". Therefore, the level of the output of the AND circuit 3 is accordingly rendered "0", so that the actions of circuits on the memory side, i.e., the AND circuit 3 and the F—F circuits 5 - 11, are either inactive or represent their holding stage.

At the time of photographing, the shutter release button is depressed so that the mirror-up action is effected. Whereupon, also the shutter blades (or the front curtain) is opened. By the already energized electromagnet M, the shutter blades (or the front curtain) is held in the opened state. During this part of operation, the trigger switch $SW_1$ is also opened interlockingly with the opening action of the shutter blades. Accordingly, one of the inputs of the AND circuit 4 is rendered to the level of "1" by virtue of the source voltage Vcc. As a result, the CLOCK pulses coming from the circuit 2 are gated, so that the AND circuit 4 produces an output "1" for each entry therein of an input "1" resulting from the CLOCK pulse $b$. This signal pulse D is divided of its frequency progressively as it is passed through the respective F—F circuits 15, 16, 17, 18, 19, 20 and 21. And, when the respective theoretical output values of the output stage F—F circuits 19, 20 and 21 coincide with the respective theoretical output values of the F—F circuits 9, 10 and 11, all of the respective outputs of the EX·OR circuits 12, 13 and 14 are rendered to the output level of "0". And, the respective outputs of these EX·OR circuits 12, 13 and 14 are applied, as the inputs, to an NOR circuit 22. For this reason, only when the respective inputs are in the level of "0", the outputs of the NOR circuit 22 are rendered to "1" in level. As a consequence, this output level "1" will serve as the re-setting input level "1" for the RS F—F circuit 23. Accordingly, the outputs of this RS F—F circuit 23 become "0" in level. As a result, the voltage applied to the base of the transistor $Tr_1$ ceases, and this transistor $Tr_1$ is rendered to the "cut-off" state. Along with this, the supply of current to the electromagnet M which till then has been holding the shutter blades subsequent to the opening of the trigger switch $SW_1$ is cut off, and the shutter blades (or the rear curtain) are closed.

In FIG. 1, those F—F circuits 24, 25 and 26 which are indicated by broken lines are intended for introducing the information on the opening size of the diaphragm. For example, if a single stage F—F circuit is electrically connected by a slide switch $SW_2$, the frequency is divided at a rate twice as great so that it is possible to obtain an exposure time which is actually two times as great in value as the numerical value memorized previously by the F—F circuits 9 - 11. It is needless to say, therefore, that by the use of three-stages of F—F circuits, the exposure time can be increased to $2^3 = 8$ times. As such, this arrangement is convenient and desirable for the introduction of diaphragm factors of multiplication system. It is also possible to introduce the light sensitivity indice of film into the F—F circuits 24 - 26 region.

Actual memorizing action is effected by utilizing the length of time from the depression of the shutter release button up to the mirror-up action. Therefore, this memorizing action is performed during a very short length of time of the order of 0.1 second. For this reason, in case a memory of a wide range is required, it is desirable to provide the F—F circuits 15 - 18 in more than four stages which are illustrated. For example, it will be convenient if these F—F circuits are provided in about seven stages in order to compress the information on the brightness of the object to be photographed.

In FIG. 2, there is shown an example of a photoelectric single pulse generating circuit for generating single pulses each having a pulse width which is inversely proportioned to the brightness of the object to be photographed. Referring now to FIG. 2, let us assume a switch $SW_3$ is closed. Since the transistor $Tr_4$ is in its "off" state, an output "1" is generated from the output point on the collector side of this transistor. During this part of operation, the capacitor which is connected in series with a photoconductive element Rx is being charged through this photoconductive element Rx. Therefore, when the potential of this capacitor reaches a predetermined value, the respective transistors $Tr_2$, $Tr_3$ and $Tr_4$ are rendered conductive, so that the outputs from the respective output points will have the output level "0". Since the velocity with which the state of these transistors $Tr_2 - Tr_4$ is inverted from "off" to "on" is associated with the resistance value of the photoconductive element Rx, the length of time in which the output continues to be "1" in level following the make of the switch $SW_2$, i.e., the width of pulse, will be shortened when the object is bright, whereas this pulse width will be prolonged when the object is dark. It is desirable that arrangement be provided so that the make of the switch $SW_3$ is performed by utilizing the very beginning part of action of the shutter release button.

Figure 3:
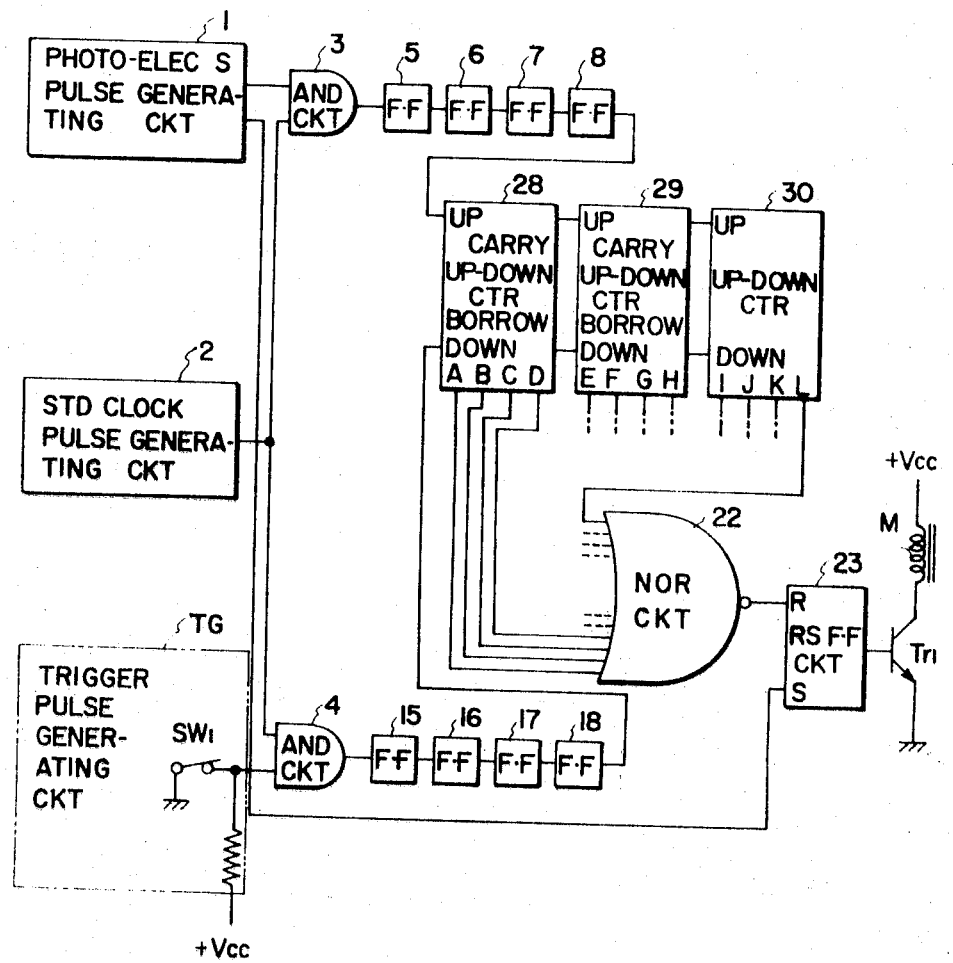
FIG. 3 is a block diagram representing a partial modification of the example shown in FIG. 1.

In FIG. 3, there is shown another example of the circuitry shown in FIG. 1 with some local modification. It should be understood that, in this specification and drawings, like reference numerals are used to indicate like parts. It should be understood also that, in FIG. 1, the coincidence between the stored numerical values of the output stage F-F circuits 9, 10 and 11 and the counts of the output stage F—F circuits 19, 20 and 21 at the time of an actual photographing is detected by the use of the EX·OR circuits 12, 13 and 14. The circuit arrangement in FIG. 3, however, is different from that shown in FIG. 1 in that the former employs UP-DOWN counter means for the aforesaid comparison circuits 12, 13 and 14.

At the time of storing information prior to photographing, the output derived from the F—F circuit 8 in FIG. 3 serves as the "UP" input of the UP-DOWN counter 28, and this is used for the purpose of up-carrying the numerical unit. The CARRY output of the counter 28 which is for use in shifting the unit is fed to the UP-DOWN counters 29 and 30 successively in this order. In this drawing, there are shown UP-DOWN counters each having four stages of numerical value outputs, the entire stages ranging from A to L. As is so with the preceding example, the counts are memorized by the UP-DOWN counters 28 - 30 also in the instant example.

At the time of actual photographing, the output delivered from the F—F circuit 18 serves as the "DOWN" input of the counter 28 for effecting down-shifting of the unit, so that in a way reverse of that for storing, the already memorized numerical values are subtracted successively. After all, at the time when the number of the pulses entering into the "UP" input has become equal to the number of pulses entering into the "DOWN " input, the respective numerical value outputs A – L delivered from the counters 28, 29 and 30 assume the output level "0", so that the outputs in the level of "1" are delivered from the NOR circuit 22. As a result, in the same fashion as that described in connection with the circiutry shown in FIG. 1, these outputs which are "1" in level serve as the re-setting inputs of the RS F—F circuit 23 which accordingly produces outputs in the "0" level. As a consequence, there is no longer an input applied to the transistor $Tr_1$, so that the supply of current to the electromagnet M ceases and accordingly the shutter blades (or rear curtain) are closed.

Figure 4:
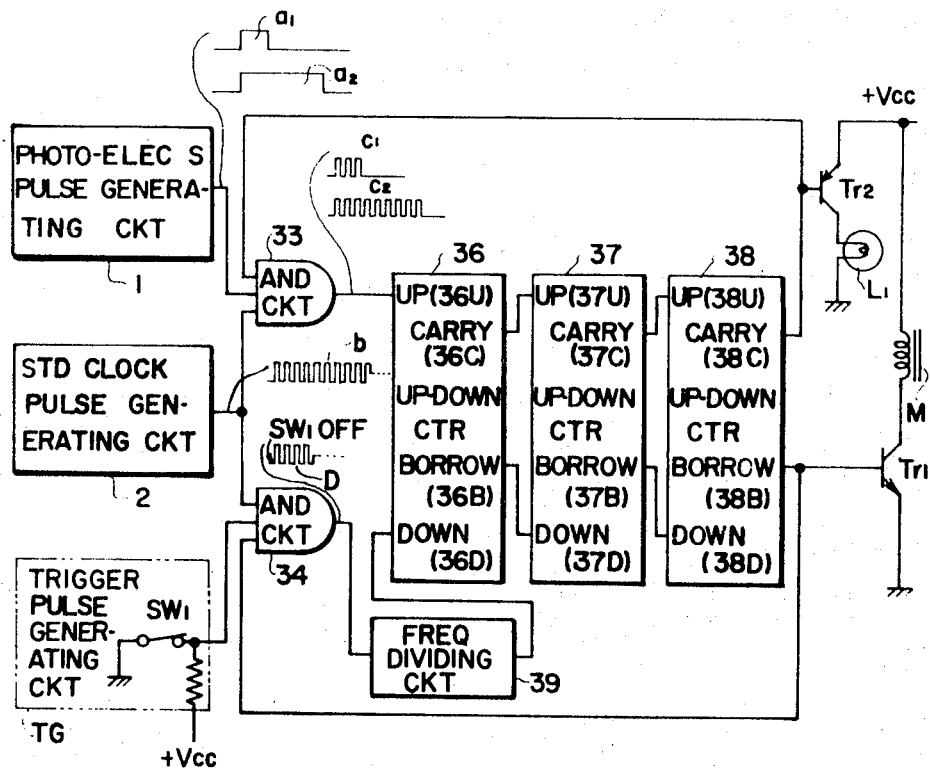
FIG. 4 is a block diagram showing another simplified modification of the one shown in FIG. 1.
Figure 5:
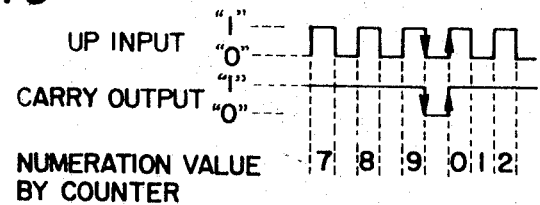
FIGS. 5 and 6 are explanatory illustrations, showing the waveforms of the CARRY output and the BORROW output, respectively, of the UP-DOWN counter means.
Figure 6:
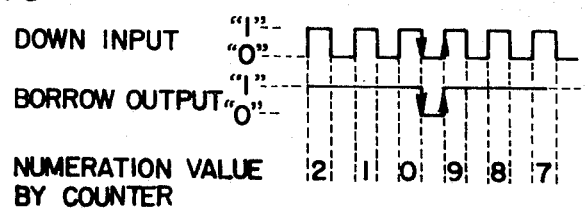

In FIG. 4, there is shown a circuitry of the electronic shutter apparatus of the present invention, in which the circuitry shown in FIG. 1 is simplified further in block style. In the drawing, reference numerals 33 and 34 represent AND circuits which are same with the previously described AND circuits 3 and 4, respectively, excepting the fact that the instant AND circuits 33 and 34 each has three input terminals. The AND circuit 33 is arranged so that the outputs from the circuits 1 and 2 serve as the inputs of this AND circuit 33. Furthermore, this AND circuit 33 uses, as the feedback input, the "UP-CARRY" output, the CARRY output 38c, of the UP-DOWN counter 38. On the other hand, the AND circuit 34 is arranged to use the outputs from the circuit 2 and the circuit TG as its inputs, and besides, it utilizes as its feedback input the BORROW output 38B of the UP-DOWN counter 38. Numeral 36 represents a known UP-DOWN counter which is utilized ordinarily. More specifically, it has an UP input 36U, a DOWN input 36D; and a CARRY output 36C and a BORROW output 36B. At each time that CLOCK pulse is applied to the UP input 36U, the counter effects counting. And, at the decay time of the final pulse (for example, the ninth pulse in the decimal system) at which the count of the UP-DOWN counter 36 becomes its counting limit, the CARRY output which till then has been held in the output level "1" is rendered to the output level "0", as shown in FIG. 5. Whereupon, if there arrives no subsequent CLOCK pulse, the CARRY output 36C will continuously hold its output level "0". However, if there arrives a successive next input pulse, of the tenth pulse, the output level of the CARRY output 36C returns to "1" from "0" at the build-up time of this pulse. In effect, at ordinary times other than the time at which the final pulse arrives, the CARRY output 36C normally is held in the output level of "1". Also, this conventional counter is so arranged that, at each time that a CLOCK pulse is applied to the DOWN input 36D, the counts of the entering pulses are adapted to be substracted from the numerical value which has been already counted. When the counts of the UP-DOWN counter 36 thus become zero, the BORROW output 36B is rendered "0" in its output level as shown in FIG. 6 at the decay time of the particular input pulse representing the fact that the output level (for example, if the indicated value is 5, the fifth pulse) has become zero. If there is no next input arriving, then its output level "0" is held continuously. However, if there arrives a next input CLOCK pulse, the BORROW output 36B will be restored to the output level "1" at the build-up time of this CLOCK pulse. At the same time therewith, the respective indications of the UP-DOWN counter 36 will present 9, 9, 9, .... (in decimal system), though in actual practice, these indications do not have to be visualized, but instead they mean the memories associated with the voltages within the circuitry. Accordingly, at the time after the completion of the arrival of the CLOCK pulse, the outputs of this counter are in the state of having returned to "1" in level as stated previously, whereas in the ordinary state where there occurs no borrowing of numerical unit, the outputs are invariably in the state of "1" in level. Numerals 37 and 38 represent UP-DOWN counters similar to the aforsaid UP-DOWN counter 36. It should be understood that the stages of these counters may be increased as required. These UP-DOWN counters 37 and 38 have an UP input 37U and an UP input 38 U; a DOWN input 37D and a DOWN input 38D; a CARRY output 37C and a CARRY output 38C; and a BORROW output 37B and a BORROW output 38B, respectively. These UP-DOWN counters are connected in cascade fashion with each other in a manner similar to that of ordinary counting circuits. The only difference from the ordinary ccounter circuits lies in that the CARRY output 38C of the UP-DOWN counter 38 is fed back to the AND circuit 33 and this fedback output 38C serves as the input of the transistor $Tr_2$, and that the BORROW output 38B is fed back to the AND circuit 34 and also constitutes the base input of the transistor $Tr_1$. Numeral 39 represents a frequency dividing circuit which is comprised of flip-flop circuits. This frequency dividing circuit 39 is intended for increasing the read-out expansion rate of the memorized information on exposure time, or in other words, it is intended for increasing the amount of the exposure factors to be stored. It is needless to say that this frequency dividing circuit may be used in the introduction or setting of those exposure factors such as the light sensitivity of film and the information on the size of opening of the diaphragm. $Tr_2$ represents a transistor, to which is connected an alarm lamp $L_1$ for indicating an under exposure. This transistor $Tr_2$ is arranged to be operative so that, when an input in "0" level is applied to its base, the alarm lamp $L_1$ is lighted up. More specifically, when the memorizing ability of the UP-DOWN counter reaches its limit, the lamp $L_1$ is lighted up. $Tr_1$ represents a transistor, to which is connected an electromagnet M so that the holding of the shutter blades (or rear curtain) is performed by this electromagnet M. However, when an input in "0" level is applied to the base of this transistor $Tr_1$, the electromagnet M is de-energized, so that the shutter blades are closed.

Description will hereunder be made on the performance of the circuitry shown in FIG. 4. As a first step, an explanation will be made of the storing of information which is performed prior to the mirror-up action. At such a stage, it should be understood that, on the AND circuit 34 side, the trigger switch $SW_1$ remains in its closed state. Accordingly, an input in "0" level is applied to the input terminal of this AND circuit 34 resulting from this closed state of the switch $SW_1$, and the output thereof is in "0" level. Therefore, those circuits which are in the stages subsequent to this AND circuit 34 remain inoperative. However, as stated above, the BORROW output of the UP-DOWN counter 38 is producing an output level of "1". Accordingly, if the circuitry is connected to the power source Vcc, a collector current is supplied to the transistor $Tr_1$ so that a holding current is passed through the electromagnet M. On the AND circuit 33 side, however, the output of the UP-DOWN counter 38 normally is in the "1" level as described above. Therefore, when a single pulse $a$ is produced from the photoelectric single pulse generating circuit 1 prior to the mirror-up action during the initial part of operation of the shutter release button, there are passed through the AND circuit 34 — during the period of time corresponding to the pulse width of this single pulse a — those CLOCK pulses b which are generated from the standard clock pulse generating circuit 2 to be derived as the outputs of this AND circuit 34, so that at each generation of these CLOCK pulses, there is produced an output level "1". Those CLOCK pulses which have passed through the AND circuit 34 are then subjected to add-up counting by the UP-DOWN counters 36, 37 and 38, and these counts are stored directly.

In this stage of memory, in case the brightness of the object to be photographed is weak and when, accordingly, the memorizing abilities of the respective UP-DOWN counters 36, 37 and 38 reach their limits, the output 38C of the counter 38 produces outputs in "0" level as described previously. This output of "0" level is applied to the input of the AND circuit 33, so that the output of this AND circuit becomes "0" in level. Thus, subsequently, there will be applied no input pulse to the UP-DOWN counters 36, 37 and 38. As a result, these UP-DOWN counters 36, 37 and 38 will keep their limit values of memory, and the CARRY output 38C also sustains its output level of "0". Accordingly, the transistor $Tr_2$ is rendered conductive and the alarm lamp $L_1$ is light up, so that is is possible to give an under exposure information to the photographer.

At the time of photographing, the shutter button is depressed further deeply and, accordingly, both the mirror-up action and the opening of the shutter blades (or front curtain) are effected. Whereupon, the trigger switch $SW_1$ is opened, and an output in the level of "1" is produced. Also, at this stage, the BORROW output 38B is in its output level of "1" as stated previously. Therefore, the CLOCK pulses generated from the standard clock pulse generating circuit 2 are passed in succession through the AND circuit 34 after the opening of the trigger switch $SW_1$. As consequence, there are produced outputs in "1" level corresponding in number to the number of these CLOCK pulses. Accordingly, the outputs which are derived from this AND circuit 24 will have the waveform D. After the frequency of these signals D is divided appropriately by the frequency dividing circuit 39, their counts are subtracted by the UP-DOWN counters 36, 37 and 38. Then, at the arrival of the final pulse at which the number of those pulses which have been delivered from the frequency dividing circuit 39 becomes equal to the numerical value which has been already memorized by the UP input, and also at the decay time of this final pulse, the BoRROW output 38B of the UP-DOWN counter 38 produces outputs in "0" level ( see FIG. 6). These outputs having the "0" level which are produced from the BORROW output are fed back to the input of the AND circuit 34. Therefore, the AND circuit 34 ceases its action. Along with this, at the time at which the outputs from the BORROW output 38B become "0" level, the transistor $Tr_1$ is rendered to the "cut-off" state, causing the electromagnet M to be de-energized. Accordingly, the shutter blades (or rear curtain) are closed and thus the photography completes.

In the state of the circuitry in which the alarm lamp $L_1$ is lighted up, or in other words, in the state in which the amounts of memory of the UP-DOWN counters 36, 37 and 38 represent their limit amounts, let us assume that the shutter release button is forced to be depressed and that accordingly the shutter blades (or front curtain) are opened. Under this condition, it is needless to say that the shutter blades (or rear curtain) are closed at the time at which the number of the output pulses of the frequency dividing circuit 39 reaches the limit values of amounts of memory following the opening of the switch $SW_1$.

As the frequency dividing circuit 39, flip-flop circuits are used ordinarily. In these circuits, the frequency is divided in the order of eight stages or to about 1/256. As stated previously, the length of time which is utilized in memory is ordinarily the period of time up to the mirro-up action during the course of the shutter release operation. More specifically, only such a short length of time as the order of 0.1 second can be utilized for this purpose. This is why the use of a frequency dividing circuit 39 becomes necessary. Also, in case the exposure factors such as the light sensitivity of film and the information on the opening size of the diaphragm are to be introduced, it will be desirable, if necessary, to add a further flip-flop stage at a position of the read-out side being at the front region from the DOWN input 36D of the UP-DOWN counter 36. For example, if the diaphragm calibre reading is to be altered from $f = 5.6$ to $f = 5.8$ at the time a photograph is to be taken, one flip-flop stage is additionally provided in the frequency dividing circuit to further decrease the number of those CLOCK pulses delivered from this frequency dividing circuit to ½. As a result, the exposure time will be doubled.

The apparatus according to the present invention has been described above in connection with some specific examples. It should be understood, however, that various modifications and changes in both design and arrangement may be made by those skilled in the art without departing from the scope of the appended claims.

I claim:

1. An electronic shutter apparatus for cameras, comprising an electromagnet for holding shutter blades at their opened position when the electromagnet is energized; a photoelectric single pulse generating circuit for generating single pulses by the initial part of action of a shutter release button, said single pulse having a pulse width inversely proportional to the brightness of the object to be photographed; a standard clock pulse generating circuit for generating continuous CLOCK pulses each having a constant frequency; a trigger pulse generating circuit containing a trigger switch actuated by the shutter when this shutter is released by the advanced action of the shutter release button and generating trigger pulses by this trigger switch; a first AND circuit connected to said photo electric single pulse generating circuit and also to said standard clock pulse generating circuit to pass therethrough the input CLOCK pulses throughout the inputting period of the photoelectric single pulses; a second AND circuit connected to said standard clock pulse generating circuit and also to said trigger pulse generating circuit to pass therethrough the input CLOCK pulses throughout the inputting period of the trigger pulses; a first counter circuit connected to the output side of said first AND circuit and containing output stages for dividing the frequency of the CLOCK pulses having passed through said first AND circuit and for memorizing the resulting CLOCK pulses; a second counter circuit connected to the output side of said second AND circuit and containing output stages for dividing the frequency of the CLOCK pulses having passed through said second AND circuit and for reading-out the resulting CLOCK pulses; binary counters respectively corresponding with each other in said respective output stage of said first and second counter circuits; a detecting circuit for detecting the coincidence of the number of pulses; an RS flip-flop circuit having a reset input terminal connected to the output terminal of said detecting circuit and having a set input terminal connected to said photoelectric single pulse generating circuit; and a transistor to said RS flip-flop circuit and having said electromagnet controlling the shutter at the time when said detecting circuit generated its output, and containing said electromagnet adapted to be released of its energized state by the output of said coincidence circuit, whereby the shutter is adapted to be closed when the numerical value indicating the brightness of the object to be photographed and having been memorized period to photographing coincides with the numerical value of same at the time of actual photographing.

2. An electronic shutter according to claim 1, in which the respective output stage of said first and second counter circuits comprise an UP-DOWN counter, and output terminals of said UP-DOWN counter are respectively connected to input terminals of associated NOR circuits.

3. An electronic shutter apparatus according to claim 1, in which a part of the counter circuits contained in said second counter circuit is associated with the information on the object to be photographed, such as the size of opening of the diaphragm and the light sensitivity of film.

4. The apparatus of claim 1, including: exclusive OR circuits respectively connected to said binary counter, said detecting circuit includes said exclusive OR circuits and NOR circuits as their inputs, respective outputs of said exclusive OR circuits.

5. An electronic shutter apparatus according to claim 1, in which said second counter circuit has stages greater in number than the stages of the first circuit, whereby the time length required for the memory can be made shorter than the time length required for an actual exposure.

6. An electronic shutter apparatus for cameras, comprising an electromagnet for holding shutter blades at their opened position when this electromagnet is energized; a photoelectric single pulse generating circuit for generating single pulses by the initial part of action of a shutter release button, said single pulse having a pulse width inversely proportioned to the brightness of the object to be photographed; a standard clock pulse generating circuit for generating continuous CLOCK pulses each having a constant frequency; a trigger pulse generating circuit containing a trigger switch actuated by the shutter when this shutter is released by the advanced action of the shutter release button and generating trigger pulses by this trigger switch; a first AND circuit connected to said photoelectric single pulse generating circuit and also to said standard clock pulse generating circuit to pass therethrough the input CLOCK pulses throughout the inputting period of the photoelectric single pulses; a second AND circuit connected to said standard clock pulse generating circuit and also to said trigger pulse generating circuit to pass therethrough the input CLOCK pulses throughout the inputting period of the trigger pulses; UP-DOWN counter means having an UP input connected to the output of said first AND circuit, a DOWN input connected to the output of said second AND circuit and a BORROW output; and an actuating circuit connected to the BORROW output of said UP-DOWN counter means and containing said electromagnet adapted to be released of its energized state by said BORROW output; whereby the shutter is adapted to be closed when the numerical value indicating the brightness of the object to be photographed and having been memorized prior to photographing coincides with the numerical value of same at the time of actual photographing.

7. An electronic shutter apparatus according to claim 6, in which said UP-DOWN counter means are comprised of cascade connection of a plurality of UP-DOWN counters.

8. An electronic shutter apparatus according to claim 6, in which a frequency dividing circuit is inserted between the output of said fourth AND circuit and the DOWN input of said UP-DOWN counter means.

9. An electronic shutter apparatus according to claim 8, in which said frequency dividing circuit is comprised of a binary counter, and a part of this binary counter is associated with the information on the object to be photographed, such as the information on the opening size of the diaphragm and the light sensitivity of film.

10. An electronic shutter apparatus according to claim 6, in which the CARRY output of said UP-DOWN counter means is fed back to the input of said third AND circuit, and the BORROW output of said UP-DOWN counter means is fed back to the input of said fourth AND circuit.

11. An electronic shutter apparatus according to claim 10, in which the apparatus has an alarm lamp connected to a transistor which, in turn, is connected to the output side of said UP-DOWN counter means.

* * * * *